United States Patent [19]
Durth

[11] Patent Number: 4,701,334
[45] Date of Patent: Oct. 20, 1987

[54] METHOD OF SELECTIVELY OPERATING A COOKING APPARATUS WITH CIRCULATING HEATED AIR OR WATER VAPOR

[75] Inventor: Wilfried Durth, Burbach-Wahlbach, Fed. Rep. of Germany

[73] Assignee: Buderus Aktiengesellschaft, Wetzlar, Fed. Rep. of Germany

[21] Appl. No.: 800,470

[22] Filed: Nov. 21, 1985

[30] Foreign Application Priority Data
Nov. 29, 1984 [DE] Fed. Rep. of Germany ....... 3443477

[51] Int. Cl.$^4$ ............ A23L 1/01; A47J 37/00
[52] U.S. Cl. .................... 426/510; 99/339; 126/20; 219/401; 426/523
[58] Field of Search ............ 426/523, 510; 99/446, 99/447, 339; 126/20, 20.2, 15 A; 219/400, 401, 343

[56] References Cited
U.S. PATENT DOCUMENTS

| | | | |
|---|---|---|---|
| 4,092,390 | 5/1978 | Mulvany | 219/400 |
| 4,202,259 | 5/1980 | Johansson | 99/447 |
| 4,262,026 | 4/1981 | Korkmaz | 426/523 |
| 4,420,679 | 12/1983 | Howe | 126/21 A |

Primary Examiner—George Yeung
Attorney, Agent, or Firm—Karl F. Ross; Herbert Dubno

[57] ABSTRACT

The conversion operation of a cooking apparatus which is initially operated using heated air at approximately 250° C., to an operation using water vapor is made possible in a short period of time and without danger by lowering the temperature to approximately 100° C. in the cooking space wall prior to steam or water vapor operation.

5 Claims, 3 Drawing Figures

METHOD OF SELECTIVELY OPERATING A COOKING APPARATUS WITH CIRCULATING HEATED AIR OR WATER VAPOR

FIELD OF THE INVENTION

My present invention relates to a food treatment method and, more particularly, to a method of selectively operating a cooking apparatus with circulating heated air and water vapor or steam.

BACKGROUND OF THE INVENTION

It is known that a cooking process, i.e., the steaming or boiling or other treatment of foodstuffs to cook them, can be accelerated and made more uniform by circulating hot air in the cooking space by a blower thereby cooking the comestible product in a uniform manner. The air is distributed by corresponding guides or baffles. In such apparatus, instead of hot or heated air, use can also be made of water vapor or steam.

The steam cr steaming operation, however, can also be carried out at temperatures up to approximately 100° C., at least where the interior of the oven is to be at ambient pressure.

Accordingly, when switching an apparatus, which is initially operated at a temperature of approximately 250° C. by heated air for the first described cooking mode, it is generally necessary to allow the temperature to drop to approximately 100° C., lest too much steam be produced and excessive pressure build-up occur.

The natural cooling of the cooking space to a temperature of 100° C. for the steaming, however, takes a rather long time which can detrimentally affect the quality of the food which is to be cooked and the efficiency of the cooking operations.

Although one can open the charging door to aid somewhat in lowering the temperature, heat energy will then be lost.

OBJECT OF THE INVENTION

It is accordingly an object of the invention to automatically carry out the conversion from the heated air operation mode to the steam operation mode in a more rapid manner and without energy losses.

SUMMARY OF THE INVENTION

These objects are attained in accordance with the invention in that during changeover of the operation mode from that employing heated air to that of employing water vapor, a cooking space wall is sprayed with cold water for a period of time sufficient to lower the temperature in the cooking space to about 100° C.

Advantageously, the back wall of the cooking space is sprayed with water, and a ventilating blower or fan for circulating heated air or water vapor, respectively, is arranged at this back wall.

The invention is also concerned with a cooking apparatus for carrying out the method briefly described above, in which a solenoid valve for controlling the supply of cooling water is monitored by a thermostat sensor. The cooling unit or system also includes a conduit or similar means for suppplying water and a spray nozzle directed towards the respective cooking space wall, for example, the rear wall of the cooking space.

Advantageously, the cooling system comprised of the thermostat sensor, solenoid valve, and the spray nozzle is first acutated in the control sequence, and in an automatic manner, with respect to the other elements which are operational during the steam or steaming operation mode.

Due to the large surface area of the cooking space wall which is sprayed with the cold water, a large heat exchange surface is provided. The heat abstracted during vaporization of cold water from the cooking space ensures that the cooking space temperature is lowered to the required 100° C. within a short period of time. The energy used for vaporization, however, is not wasted since the resulting water vapor is used for the subsequent steam operation mode.

BRIEF DESCRIPTION OF THE DRAWING

The above and other objects, features and advantages of my invention will become more readily apparent from the following description, reference being made to the accompanying highly diagrammatic drawing, in which.

SPECIFIC DESCRIPTION

The cooking space muffle 1 is insulated for heat and can be loaded at the forward end by way of a door 2. The gaseous swirls created in the cooking space 3 are precluded from leaving the apparatus because of a door seal 4 which is correspondingly arranged thereabout.

Figure 2:
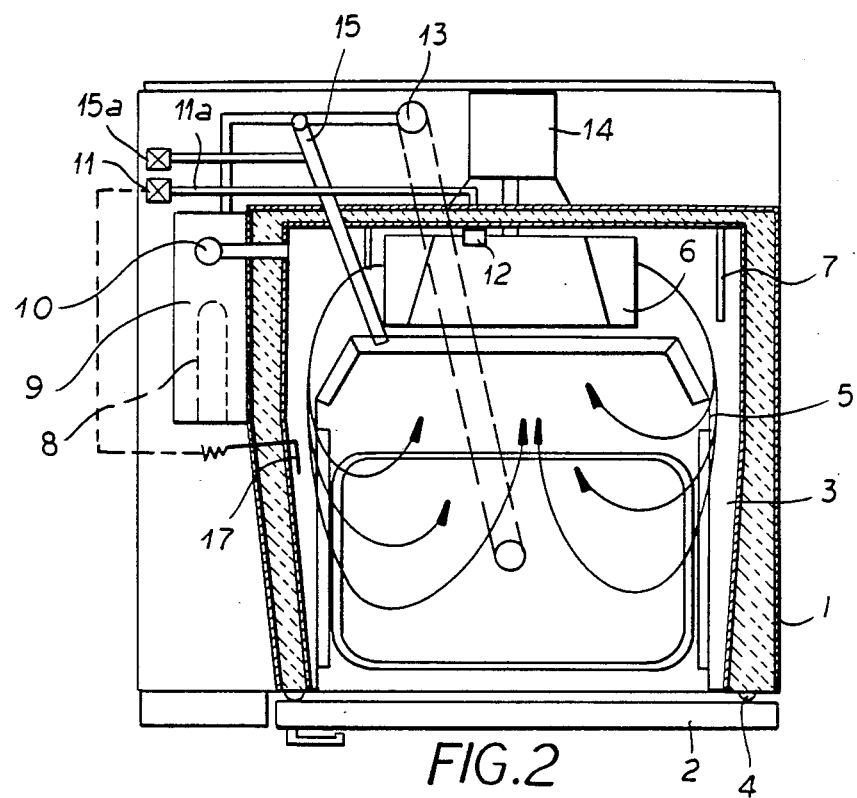
FIG. 2 is a horizontal cross section through the cooking apparatus.
Figure 3:
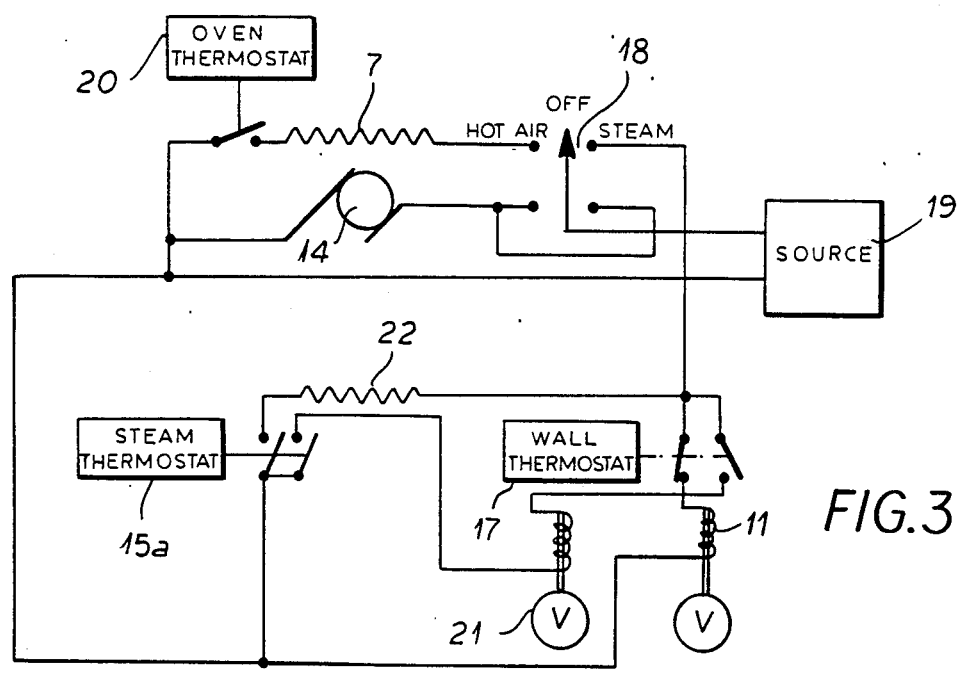
FIG. 3 is a circuit diagram for the oven.

Air guide sheets or baffles 5 serve to uniformly distribute the heating medium which is circulated by the ventilating wheel blower or fan 6 (FIG. 2). The circulating heated air displaced by the blower 6 is passed along the electrical resistive heating bodies or elements 7 and reaches, via the lateral air guide sheets 5, between and to the individual tiers or levels of the cooking space 3. From here the hot air is again centrally sucked-in by the blower 6. The motor 14 drives the ventilating wheel 6.

In the steam operation mode, the steam generator 9 is heated by the heater 8, and water vapor is passed from the steam producer 9 via the steam conduit 10 to the cooking space.

Figure 1:
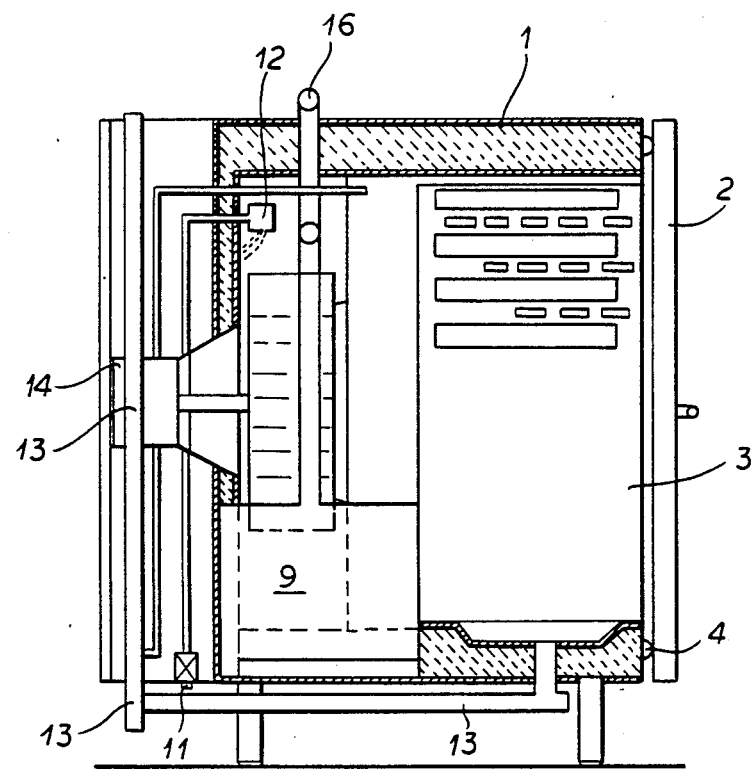
FIG. 1 is a vertical cross section through the cooking apparatus.

One may wish to cook initially at 250° C. using heated air, and then to convert to the steam operation mode by introduction of water vapor; for this, first the solenoid valve 11 of the cooling system or unit is opened, and cold water passing through conduit 11a is strayed from a nozzle 12 (FIG. 1) onto the rear wall of the cooking space. The valve 11 is also referred to as water valve and serves to control the flow of cooling water.

The cooking space is connected by way of the drain and venting conduit 13 with the free atmosphere, and formation of overpressure will be avoided.

A steam thermostat 15a (FIG.2) is arranged in the sensor duct 15. The thermostat 15a controls the steam producer 9 during the steam operation. The reference numeral 16 indicates a safety valve atop the steam producer 9.

The sequence on conversion from heated air operation to steam operation is as follows:

During the control adjustment of the apparatus to heated air operation, the ventilating wheel 6 is driven by the motor 14, and the heating elements 7 are operational when the desired heated air temperature of, for example, 250° C. has not been attained. As soon as the apparatus is switched to steam operation, the valve 11 is opened for such a period of time until the thermostat sensor 17 indicates that a sufficient volume of cold water has been sprayed onto the rear wall to lower the temperature in the cooking space to approximately 100° C., Then, water vapor is directed in the usual manner from the steam producer 9 into the cooking space.

The required control steps can be carried out automatically when the operating person switches the apparatus from heated air operation to steam operation.

A selector switch 18 has, in addition to its "off" position, a "hot air" position and a "steam" operation.

In its "hot air" position, the switch can not only connect the blower motor 14 to the electric current source 19, but also energize the heaters 7 for heating the air to the desired hot air temperature as controlled by the oven thermostat 20.

In the "steam" position, however, the switch 18 can initially energize the solenoid valve 11 through the rearwall temperature thermostat 17 which, as the rear wall temperature drops to 100° C., deenergizes the valve 11, to terminate the cold water spray, and opens the solenoid steam valves 21 which, like the heater 22 of the steam generator are under the control of the thermostat 15a mentioned earlier.

Thus, the cooking apparatus can readily be selectively used: initially in an operation which heated air of approximately 250° C.; and also in a steam operation. The conversion is achieved in a short period of time and without danger. This is achieved by lowering the temperature in the cooking space temperature to approximately 100° C. with a spray of water directed onto a cooking space wall prior to commencement of the steam operation.

I claim:

1. In a method of cooking a foodstuff by selectively operating a cooking apparatus with circulating heated air or circulating water vapor, at least one circulating blower, and wall defining a cooking space, the improvement which comprises the steps of:

for changing an operating mode from circulating heated air to circulating water vapor in the cooking of the foodstuff, spraying a cooking space wall with a sufficient volume of cold water for a period of time until the temperature in the cooking space has been lowered to approximately 100° C., then terminating the spraying of cold water; and thereafter admitting steam to said space to effect water vapor cooking of the foodstuff.

2. The method defined in claim 1, further comprising the step of circulating the heated air or water vapor from a location near the cooking space wall which is being sprayed with cold water.

3. The method defined in claim 1 wherein a back wall of the cooking space is sprayed with water.

4. In a method of cooking a foodstuff by selectively operating a cooking apparatus with circulating heated air or water vapor, the improvement which comprises during changing of an operating mode from heated air to water vapor in the cooking of the foodstuff, spraying a wall of a cooking space with cold water for a period of time until the temperature in the cooking space is lowered to about 100° C.; and admitting steam to said cooking space to effect water vapor cooking of the foodstuff when a temperature of about 100° C. in the cooking space has been reached.

5. The method defined in claim 4 wherein a back wall of the cooking space is sprayed with water, and a blower for circulating heated air or water vapor, respectively is arranged at this back wall.

* * * * *